(12) United States Patent
Baur

(10) Patent No.: US 11,807,169 B2
(45) Date of Patent: Nov. 7, 2023

(54) VEHICULAR VISION SYSTEM WITH ENHANCED FORWARD AND SIDEWARD VIEWS

(71) Applicant: Magna Mirrors of America, Inc., Holland, MI (US)

(72) Inventor: Michael J. Baur, Kentwood, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 242 days.

(21) Appl. No.: 17/249,179

(22) Filed: Feb. 23, 2021

(65) Prior Publication Data

US 2021/0261059 A1    Aug. 26, 2021

Related U.S. Application Data

(60) Provisional application No. 62/980,459, filed on Feb. 24, 2020.

(51) Int. Cl.
*B60R 1/12* (2006.01)
*B60R 1/08* (2006.01)

(52) U.S. Cl.
CPC .................. *B60R 1/12* (2013.01); *B60R 1/08* (2013.01); *B60R 2001/1215* (2013.01); *B60R 2300/10* (2013.01); *B60R 2300/20* (2013.01)

(58) Field of Classification Search
None
See application file for complete search history.

(56) References Cited

U.S. PATENT DOCUMENTS

| | | |
|---|---|---|
| 4,546,551 A | 10/1985 | Franks |
| 4,953,305 A | 9/1990 | Van Lente et al. |
| 5,530,240 A | 6/1996 | Larson et al. |
| 5,550,677 A | 8/1996 | Schofield et al. |
| 5,576,687 A | 11/1996 | Blank et al. |
| 5,632,092 A | 5/1997 | Blank et al. |
| 5,668,663 A | 9/1997 | Varaprasad et al. |
| 5,670,935 A | 9/1997 | Schofield et al. |
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |
| 5,802,727 A | 9/1998 | Blank et al. |
| 5,878,370 A | 3/1999 | Olson |
| 5,949,331 A | 9/1999 | Schofield et al. |

(Continued)

*Primary Examiner* — Xiaolan Xu
(74) *Attorney, Agent, or Firm* — HONIGMAN LLP

(57) ABSTRACT

A vehicular vision system includes a camera disposed at a side of a vehicle so as to view at least sideward and forward of the vehicle including a forward blind zone ahead of the vehicle that is caused by a leading vehicle ahead of the equipped vehicle and in the same traffic lane along which the equipped vehicle is traveling. The camera captures image data. An electronic control unit (ECU) includes electronic circuitry and associated software, with the electronic circuitry including an image processor for processing image data captured by the camera. A display screen is disposed in the equipped vehicle and viewable by a driver of the vehicle. The display screen, responsive to processing by the image processor of image data captured by the camera, displays video images derived from image data captured by the camera to provide displayed images of the forward blind zone ahead of the vehicle.

21 Claims, 4 Drawing Sheets

(56) References Cited

U.S. PATENT DOCUMENTS

| | | | |
|---|---|---|---|
| 6,087,953 A | 7/2000 | DeLine et al. |
| 6,173,501 B1 | 1/2001 | Blank et al. |
| 6,222,460 B1 | 4/2001 | DeLine et al. |
| 6,329,925 B1 | 12/2001 | Skiver et al. |
| 6,513,252 B1 | 2/2003 | Schierbeek |
| 6,642,851 B2 | 11/2003 | Deline et al. |
| 6,690,268 B2 | 2/2004 | Schofield et al. |
| 6,717,712 B2 | 4/2004 | Lynam et al. |
| 6,919,796 B2 | 7/2005 | Boddy et al. |
| 7,004,593 B2 | 2/2006 | Weller et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,748,856 B2 | 7/2010 | Zhao |
| 7,855,755 B2 | 12/2010 | Weller et al. |
| 7,934,843 B2 | 5/2011 | Lynam |
| 9,041,806 B2 | 5/2015 | Baur et al. |
| 9,126,525 B2 | 9/2015 | Lynam et al. |
| 9,596,387 B2 | 3/2017 | Achenbach et al. |
| 9,762,880 B2 | 9/2017 | Pflug |
| 9,834,153 B2 | 12/2017 | Gupta et al. |
| 9,900,522 B2 | 2/2018 | Lu |
| 10,046,706 B2 | 8/2018 | Larson et al. |
| 10,071,687 B2 | 9/2018 | Ihlenburg et al. |
| 10,127,463 B2 | 11/2018 | Fursich |
| 10,166,924 B2 | 1/2019 | Baur |
| 10,421,404 B2 | 9/2019 | Larson et al. |
| 10,562,624 B2 | 2/2020 | Baur |
| 2005/0246096 A1* | 11/2005 | Bracht | G01C 21/26 701/431 |
| 2006/0050018 A1 | 3/2006 | Hutzel et al. |
| 2006/0061008 A1 | 3/2006 | Kamer et al. |
| 2012/0162427 A1 | 6/2012 | Lynam |
| 2013/0016209 A1* | 1/2013 | Taylor | G01C 21/36 348/118 |
| 2014/0022390 A1 | 1/2014 | Blank et al. |
| 2014/0285666 A1 | 9/2014 | O'Connell et al. |
| 2015/0022664 A1 | 1/2015 | Pflug et al. |
| 2017/0015248 A1* | 1/2017 | Baur | B60R 1/00 |
| 2018/0086272 A1* | 3/2018 | De Wind | B60R 1/062 |
| 2018/0134217 A1 | 5/2018 | Peterson et al. |
| 2020/0020235 A1* | 1/2020 | Smith | B60R 1/00 |
| 2020/0148214 A1* | 5/2020 | Tamagaki | G06V 20/597 |
| 2021/0155167 A1 | 5/2021 | Lynam et al. |
| 2021/0162926 A1 | 6/2021 | Lu |
| 2021/0245662 A1 | 8/2021 | Blank et al. |
| 2022/0189077 A1* | 6/2022 | Murasumi | G06T 11/60 |

* cited by examiner

VEHICULAR VISION SYSTEM WITH ENHANCED FORWARD AND SIDEWARD VIEWS

CROSS REFERENCE TO RELATED APPLICATION

The present application claims the filing benefits of U.S. provisional application Ser. No. 62/980,459, filed Feb. 24, 2020, which is hereby incorporated herein by reference in its entirety.

FIELD OF THE INVENTION

The present invention relates generally to a vehicle vision system for a vehicle that provides the driver of the vehicle with views exterior the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Use of blind spot viewing mirrors is also known to enhance a driver's view at the sides and rear of the vehicle. Examples of such known systems are described in U.S. Pat. Nos. 7,934,843; 7,748,856; 7,626,749; 6,919,796 and/or 6,717,712, which are hereby incorporated herein by reference in their entireties.

SUMMARY OF THE INVENTION

The present invention provides a driving assistance system or vision system or imaging system for a vehicle that utilizes one or more cameras (preferably one or more CMOS cameras) disposed at a side of the vehicle so as to have a field of view at least forward and sideward of the vehicle and along the respective side of the vehicle and alongside traffic ahead of the vehicle. The camera or cameras capture image data representative of images exterior of the vehicle, and a display screen displays video images derived from image data captured by the camera or cameras to provide a view to the driver of the vehicle that is forward of the vehicle and along the side or sides of the vehicle. The system thus provides enhanced viewing by the driver of the vehicle around and along other vehicles in front of the subject or host or equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to provide enhanced views exterior of the vehicle to the driver of the vehicle.

When a vehicle is traveling on the road, it is possible for the forward field of view of the driver (or the forward field of view of a vehicle vision system equipped at the vehicle) to be at least partially obstructed during certain driving conditions. For example, many vehicles (such as cargo trucks, SUVs, and other large vehicles) are tall and create substantial blind spots, limiting visibility around such a vehicle or truck or SUV to the driver or vehicle-based camera of a trailing or following vehicle. Additionally, congested traffic conditions often create situations where a following vehicle is closer to a leading vehicle than it would be during normal traffic conditions, further reducing the visibility from the following vehicle and increasing the area of a blind spot normally created by a lead vehicle.

Figure 1:
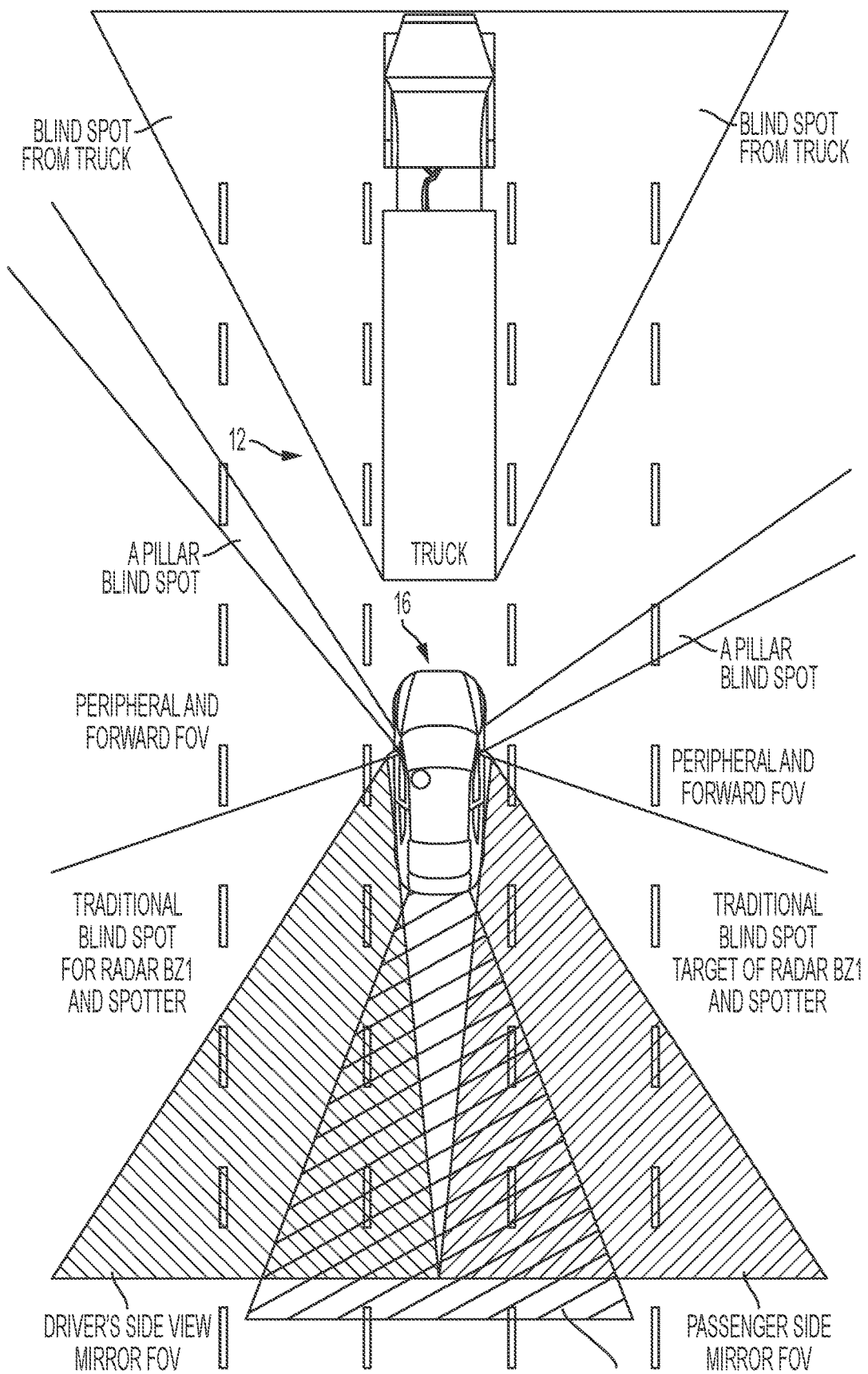
FIG. 1 is a plan view of a vehicle that incorporates mirrors and/or cameras, showing the fields of view and blind zones of the driver of the vehicle.

For example, and such as can be seen with reference to FIG. 1, a vehicle 16 following a truck 12 at close distance and traveling in the same traffic lane as the truck along a road has the forward view along the adjacent traffic lanes partially or fully obstructed by the truck. FIG. 1 shows the various fields of view and blind zones that a driver and/or vision system of the following vehicle may experience via various mirrors and/or cameras equipped at the vehicle. Notably, the driver of the vehicle 16 experiences a significant forward blind spot caused by the leading truck 12. The forward blind spot includes the regions adjacent the truck (i.e., along the adjacent traffic lanes of the road) that are not visible by the view of the driver or by the view of a forward viewing camera (such as a front-mounted forward viewing camera of the vehicle or such as a windshield-mounted forward viewing camera of the vehicle). The driver will also experience an A-pillar blind spot, which is the area exterior and at least sideward and forward the vehicle and obstructed from the driver's field of view by the A-pillar of the vehicle (at each side of the vehicle).

As shown in FIG. 1, the driver of such a vehicle 16 has several fields of view, including enhanced views of areas next to and rearward of the driver's vehicle (with such enhanced views provided by cameras disposed at the rear and/or sides of the vehicle to provide blind spot views and/or rearward panoramic views and/or the like). For example, the driver is able to see forward of the vehicle (via the normal driver view through the windshield or via a forward viewing camera disposed at the windshield of the vehicle or disposed at the front grille or bumper of the vehicle), and at least sideward and forward via the driver's peripheral view (such as through driver side and passenger side windows of the vehicle). A wide angle or spotter mirror may be provided for enhanced viewing rearward and sideward of the vehicle, while the traditional driver's side and passenger side exterior rearview mirrors provide rearward views along the sides of the vehicle. An interior rearview field of view (rearward through a rear window of the vehicle) is provided by an interior rearview mirror so the driver of the vehicle can view directly behind the vehicle (and optionally such a rear view may be provided by a rearward viewing camera (such as disposed at the center high mounted stop lamp (CHMSL) of the vehicle), with video images displayed at a video display screen of the interior rearview mirror assembly. Optionally, some of the mirror-provided views may be enhanced (or replaced) by a camera monitoring system (CMS) that provides rearward viewing cameras at the rear of the vehicle and at the side of the vehicle (such as at the exterior mirrors of the vehicle), such by utilizing aspects of the systems described in U.S. Publication Nos. US-2018-0134217 and/or US-2014-0285666, and/or U.S. patent application Ser. No. 17/248,736, filed Feb. 5, 2021, now U.S. Pat. No. 11,242,008, and/or U.S. patent application Ser. No. 16/949,976, filed Nov. 23, 2020, now U.S. Pat. No. 11,498,494, and/or U.S. provisional applications, Ser. No. 63/199,858, filed Jan. 29, 2021, and Ser. No. 63/199,526, filed Jan. 6, 2021, which are all hereby incorporated herein by reference in their entireties.

As shown in FIG. 1, despite the many traditional and enhanced views provided to a driver, the driver is still unable to see along the traffic lane adjacent to a leading vehicle (particularly a large leading vehicle or truck) and thus is unable to, for example, judge the relative safety of a lane change or identify the presence of objects alongside the leading vehicle. In other words, the driver of the vehicle is presented with a significant forward blind zone or region adjacent the leading vehicle due to the present driving conditions. FIG. 1 depicts a situation where the driver of the vehicle 16 experiences a forward blind zone that includes the areas alongside the leading truck and obstructed from the driver's field of view by a portion of the truck, but other situations can exist and are applicable to the usage of a vehicle vision system according to the present invention.

Often, in urban areas where vehicle following distances are shortened due to traffic congestion, such forward blind zones create increased risks due to the inability of the driver to verify that the adjacent lane is clear on the road ahead of the vehicle. For example, a driver of a vehicle in traffic congestion behind a large vehicle (and therefore having an obstructed view of the areas adjacent the large vehicle) may wish to make a lane change into the adjacent lane to pass or go around the large vehicle. While traditional mirrors and camera systems may enable the driver to see significant portions of the adjacent traffic lane behind and to the side of the vehicle, the driver may still be unable to fully view the portion of the adjacent traffic lane next to and in front of the large vehicle. An obstructed view of the adjacent traffic lane next to and in front of the large vehicle may also present a danger in highway driving conditions where an undetected and/or unexpected object or vehicle in the blind zone presents a more significant risk due to the increased speeds of highway driving. For example, when performing a passing maneuver on a two-lane highway where the driver must, when safe and legal, utilize the oncoming traffic lane to perform the passing maneuver, an undetected oncoming vehicle presents an immediate danger, or, when performing a passing maneuver on a multi-lane highway, an undetected obstacle (such a stopped or slowed vehicle), also presents a danger. These concerns exists regardless of the type of mirror(s) on the vehicle and regardless of whether or not the vehicle has a camera monitoring system (CMS).

Figure 2:
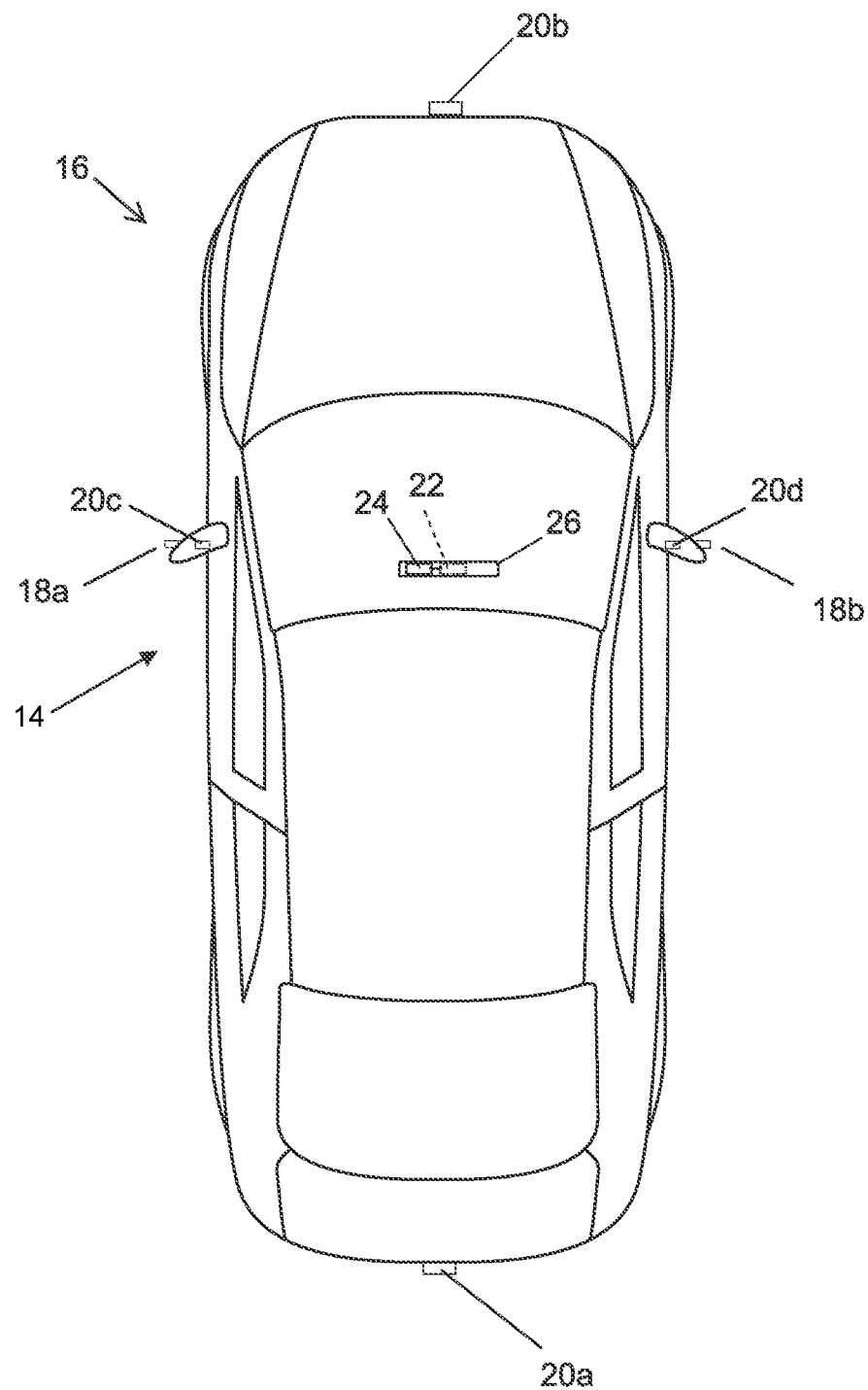
FIG. 2 is a plan view of a vehicle equipped with a vehicular vision system that incorporates mirrors and/or cameras.

As shown in FIG. 2, the vehicular vision system 14 includes a forward facing or viewing camera or optic 18a, 18b at an outboard portion of the vehicle 16 (such as at an output portion of the exterior rearview mirror assembly). The forward facing or viewing camera or optic thus provides a forward view forward and along the respective side of the vehicle. The farther outboard the camera or optic is positioned, the smaller the forward blind zone or region becomes. Additionally, the forward field of view provided by the forward facing camera or optic 18a, 18b encompasses at least a portion of the A-pillar blind zone region.

As also shown in FIG. 2, the vision system 14 may include additional cameras, such as for a surround view vision system. For example, the system may include a rearward viewing imaging sensor or camera 20a, a forward viewing camera 20b at the front of the vehicle, and a sideward/rearward viewing camera 20c, 20d at respective sides of the vehicle, which capture image data or images exterior of the vehicle, with the cameras each having a lens for focusing images at or onto an imaging array or imaging plane or imager of the respective camera. Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 14 includes a control or electronic control unit (ECU) 22 having electronic circuitry and associated software, with the electronic circuitry including a data processor or image processor that is operable to process image data captured by the cameras, whereby the ECU may detect or determine presence of objects or the like and/or the system provide displayed images at a display device 24 for viewing by the driver of the vehicle (although shown in FIG. 2 as being part of or incorporated in or at an interior rearview mirror assembly 26 of the vehicle, the control and/or the display device may be disposed elsewhere at or in the vehicle). The data transfer or signal communication from the cameras to the ECU may comprise any suitable data or communication link, such as via Texas Instrument's FPD-LINK III, or Maxim Integrated's GMSL2, low voltage differential signaling (LVDS), or ethernet, or such as a vehicle network bus or CAN (Controller Area Network) bus or LIN (Local Interconnect Network) bus or I2C bus or the like of the equipped vehicle.

Figure 3:
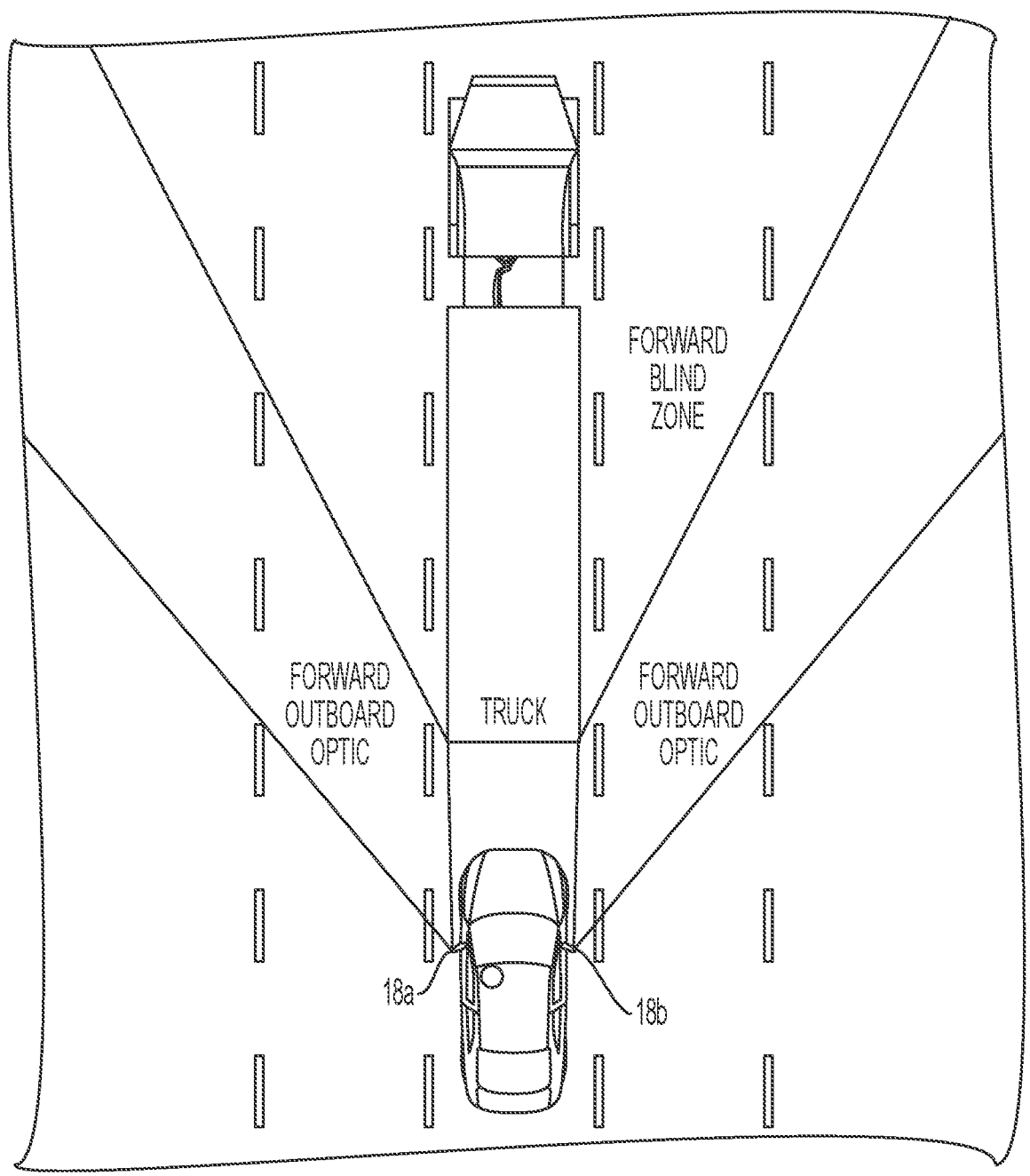
FIG. 3 is a plan view of the vehicle of FIG. 2, showing the fields of view of the side-mounted forward viewing cameras.
Figure 4:
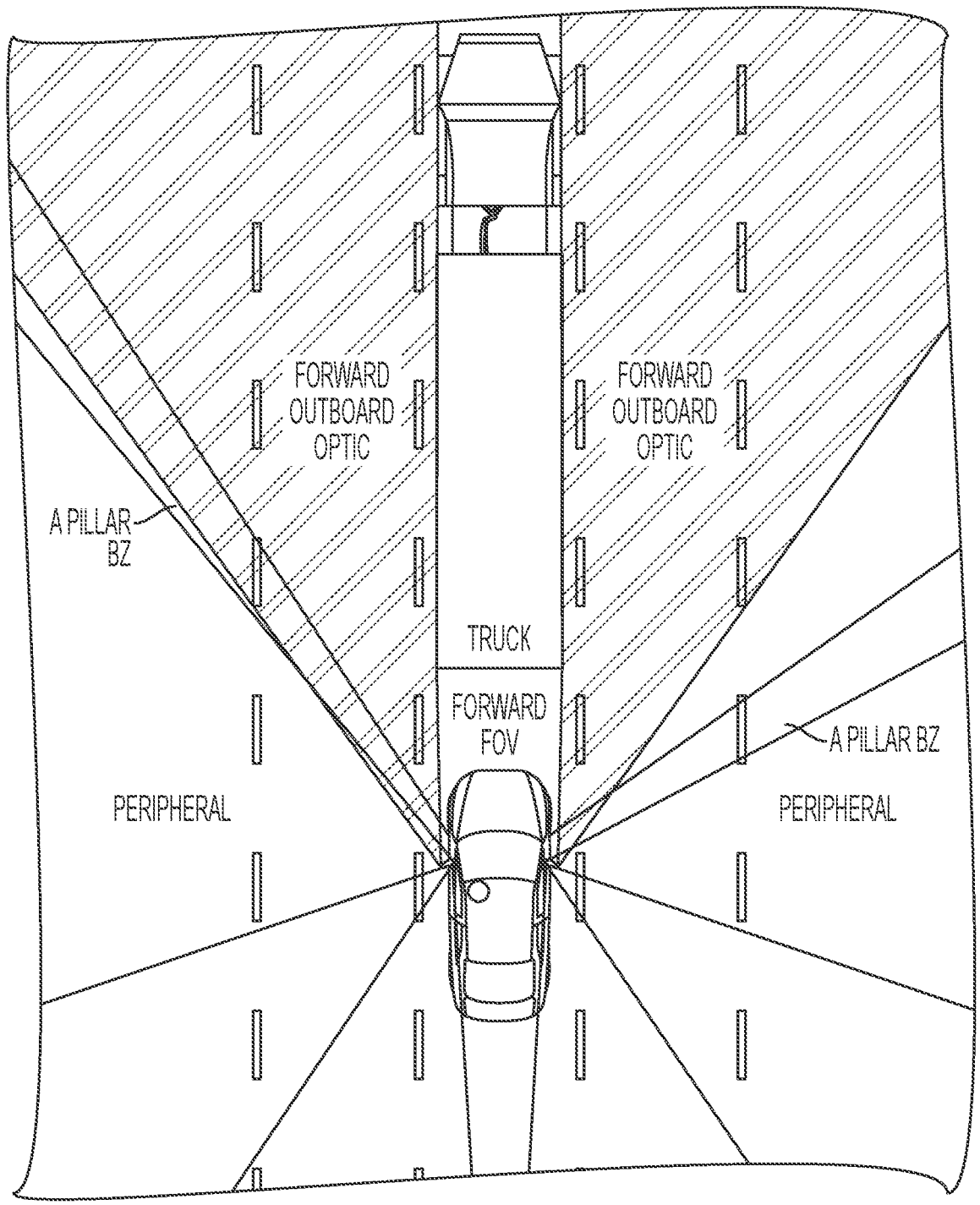
FIG. 4 is another plan view of the vehicle of FIG. 2, showing the different views of the driver of the vehicle via the mirrors and/or cameras of the vehicle and vehicular vision system.

The forward viewing camera or optic comprises a forward viewing camera 18a, 18b that captures image data representative of the region forward of the vehicle along the side of the vehicle at which the camera is disposed (see FIGS. 3 and 4). Thus, the field of view of the forward viewing camera or optic includes regions forward and sideward of the vehicle and encompasses forward blind zones such as those created by large trucks at short lead distances. The farther outboard of the vehicle the forward viewing camera 18a, 18b is placed, the farther inward (or in front of the vehicle) its forward field of view may be. As can be seen in FIG. 4, the forward viewing camera or optic has a field of view that also includes at least a portion of the A-pillar blind zone region. A wider angle view may be achieved to capture a larger portion or the entirety of the A-pillar blind zone such as through the usage of a wide angle or fish eye lens.

Video images derived from the image data captured by the forward viewing cameras (such as one forward viewing camera disposed at each side exterior rearview mirror assembly) are displayed at a display screen or monitor that is viewable by the driver of the vehicle while the driver is driving or normally operating the vehicle. For example, such video images may be displayed at a center console display or a video mirror display (disposed at and behind and viewable through the mirror reflective element of the interior rearview mirror assembly) or a CMS display (disposed at the respective A-pillar or the like). The displayed video images are displayed in any suitable fashion such as continuously displayed as the vehicle is driven (such as when the vehicle is driven in a forward direction), or displayed on demand responsive to a user input or responsive to detection (such as via image processing of image data captured by one of the forward viewing cameras) of an object present in the field of view of the forward viewing camera. The displayed video images may be displayed as part of a surround view or bird's eye view display system or may be displayed as a subset of other existing displays of the vehicle.

Optionally, in order to assist the driver in readily identifying and cognitively understanding what is shown by the display (when displaying the forward images), the display screen for displaying those images may be disposed at a particular location remote from the center console display. For example, the display screen may be at or near an upper region of the A-pillar of the vehicle on the respective side of the vehicle at which the forward viewing camera is disposed. Optionally, the display screen may be at or near the center console display, with the displayed images (derived from the forward viewing camera) displayed as a partial image in the dash cluster or at the center display, or at a particular location in a head-up display, or at a side region of the interior mirror display. Optionally, the displayed images may be part of a three dimensional display or surround view display of the vehicle.

Optionally, the forward viewing optic may comprise a mirror reflector that is positioned at a location at the side of the vehicle so that light and images reflected by the reflector are viewable by the driver of the vehicle. The mirror reflector comprises a curved reflector to provide a relatively wide angle reflected view of the area ahead of and sideward of the vehicle. The mirror reflector may be disposed at the vehicle so as to be directly viewable by the driver, or the mirror reflector may be indirectly viewable by the driver via one or more additional reflectors disposed at the vehicle to provide a reflected optic path from the forward viewing or facing optic and the driver's eyes. For example, a second reflector may be disposed at a forward upper region of the vehicle, whereby images/light reflected by the forward facing optic are reflected back by the second reflector so as to be viewable by the driver viewing the second reflector. To account for different head positions of the driver (due to different driver heights and/or seat positions), the second reflector (and/or the first reflector at the exterior mirror) may be adjustable to adjust the optic path from the driver's eyes to the area forward and sideward of the vehicle.

Depending on the location and viewing direction or field of view of the camera or optic, the camera or optic may also provide enhanced viewing by the driver of the blind spot region that is created by the vehicle's A-pillar. For example, the forward viewing camera or optic can be positioned at the exterior rearview mirror of the vehicle to monitor and provide images representative of both the A-pillar blind zone and the forward blind zone (FIG. 4). The field of view of the forward viewing optic 18a, 18b encompasses regions that include both the forward blind zone and at least a portion of the A-pillar blind zone. Displayed video images derived from image data captured by the forward viewing cameras can include the entire or majority of the field of view of the forward viewing camera(s) or can distinguish or switch between displaying video images representative of the A-pillar blind zone and displaying video images representative of the forward blind zone.

Optionally, the display can include a graphic overlay or line of demarcation or other indication that indicates to the driver that portions of the displayed images are A-pillar or forward blind zone images. The display can also switch between displaying only A-pillar blind zone images and displaying only forward blind zone images, or displaying combined A-pillar and forward blind zone images. For example, displaying the combined A-pillar and forward blind zone images during some driving conditions (such as in the absence of a leading vehicle and therefore absence of a forward blind zone) could be unnecessary and decrease a driver's ability to identify objects or vehicles in the A-pillar blind zone (such as because the combined images show a wider field of view and a present object or vehicle is more difficult to recognize in the wider field of view). Switching the display (such as via user actuatable input in the vehicle like a human machine interface (HMI) or via object detection of an object or vehicle in the A-pillar blind zone or of a lead vehicle creating a forward blind zone) from A-pillar blind zone images to combined or forward blind zone images provides a more focused and effective display dependent on the present driving circumstances. Thus, the forward viewing camera or optic can simultaneously provide images (via a video display screen disposed in the vehicle and viewable by the driver of the vehicle) to the driver of the vehicle representative of the A-pillar blind zone and/or the forward blind zone in any suitable or desired fashion.

The displayed video images may be augmented or enhanced with icons or overlays to provide enhanced clarity and reference to the forward view provided to the driver. The forward viewing cameras or optics may also be functionally enhanced with a lens cleaning device or the like (that sprays and/or wipes and/or heats the outer lens or optic of the camera).

Optionally, image data captured by the forward viewing cameras (disposed outboard of the respective sides of the vehicle) may be processed (such as via an image processor of an electronic control unit (ECU) of the vehicle) to provide additional data and information for various vehicular systems, such as for a collision avoidance system or pedestrian detection system or an autonomous vehicular control system. Additionally, when the vehicle is stuck in a traffic jam, the driver can gain insight as to the progress of traffic (and maybe as to the cause of the traffic jam by seeing a collision or broken down vehicle ahead at the side of the road) by viewing the forward side images (that allow the driver to effectively see around and along the vehicle(s) ahead of the equipped vehicle). This alleviates the anxiety and frustration that otherwise occurs when a driver is unable to see around the vehicle(s) directly in front of the equipped vehicle in slow moving high traffic conditions or traffic jams.

Thus, the vehicular vision system of the present invention comprises a forward viewing camera (or optionally a forward facing reflector) disposed outboard of the side of the vehicle (such as at an outboard region of the respective side exterior rearview mirror assembly), whereby the driver is provided images representative of the sideward and forward views so as to be able to effectively see around traffic immediately in front of the equipped vehicle. The forward viewing cameras may view substantially forward of the vehicle, such as at least 10 m or at least 30 m or at least 50 m or at least 100 m ahead of the vehicle or more so that the driver can readily view what is happening ahead of the vehicle that the driver may otherwise not see due to obstacles such as traffic and/or large vehicles directly in front of the vehicle. The forward viewing vehicular vision system may operate in conjunction with other vision systems, such as by utilizing aspects of the systems described in U.S. Pat. No. 10,562,624, which is hereby incorporated herein by reference in its entirety.

The system may provide display of video images derived from image data captured by the side-mounted forward viewing cameras to assist the driver in a passing maneuver when passing a large vehicle traveling along the same traffic lane ahead of the subject or equipped vehicle. The system may automatically or episodically display the video images responsive to determination that the driver is contemplating or beginning a lane change maneuver to move the vehicle into the adjacent traffic lane. For example, the system may determine (via image processing of image data captured by one or more forward viewing cameras of the vehicle) presence of the slower moving leading vehicle and, responsive to actuation of a turn signal indicator of the subject vehicle or responsive to determination that the subject vehicle is changing traffic lanes into the adjacent traffic lane, the system may display video images derived from image data captured by the side-mounted forward viewing camera so the driver can see the forward blind zone region ahead of the equipped vehicle and along the side of the leading vehicle before proceeding with the lane change and passing maneuver. Optionally, the system may display the video images and may also generate an alert to the driver when an object or another vehicle is detected (such as via image processing of image data captured by the side-mounted forward viewing camera) in the adjacent traffic lane ahead of the equipped vehicle and not viewable by the driver due to the presence of the leading traffic in the presently occupied traffic lane. Optionally, the system may only display the video images when an object or another vehicle is detected (such as via image processing of image data captured by the side-mounted forward viewing camera) in the adjacent traffic lane ahead of the equipped vehicle and not viewable by the driver due to the presence of the leading traffic in the presently occupied traffic lane.

Optionally, the vehicular vision system may include a video display device that utilizes aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,126,525 and/or 9,041,806, and/or U.S. Publication Nos. US-2015-0022664 and/or US-2012-0162427, which are hereby incorporated herein by reference in their entireties.

The display device may be disposed at or incorporated in an interior mirror assembly, and the interior mirror assembly may comprise a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2019-0258131; US-2019-0146297; US-2019-0118717 and/or US-2017-0355312, and/or U.S. patent application Ser. No. 16/949,976, filed Nov. 23, 2020, now U.S. Pat. No. 11,498,494, and/or Ser. No. 17/247,127, filed Dec. 1, 2020, now U.S. Pat. No. 11,505,123, which are all hereby incorporated herein by reference in their entireties.

The reflective element of the rearview mirror assembly of vehicles may include an auxiliary wide angle or spotter mirror portion, such as the types described in U.S. Pat. Nos. 7,255,451; 7,195,381; 6,717,712; 7,126,456; 6,315,419; 7,097,312; 6,522,451; 6,315,419; 5,080,492; 5,050,977 and/or 5,033,835, which are hereby incorporated herein by reference in their entireties, and optionally may have an integrally formed auxiliary mirror reflector, such as the types described in U.S. Pat. Nos. 8,736,940; 8,021,005; 7,934,844; 7,887,204; 7,824,045; and 7,748,856, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a first camera disposed outboard of a side of a vehicle equipped with the vehicular vision system, wherein the first camera views at least forward and sideward of the equipped vehicle, and wherein the first camera captures image data as the equipped vehicle travels along a road;

a second camera disposed inboard of the side of the equipped vehicle, wherein the second camera views at least forward of the equipped vehicle, and wherein the second camera captures image data as the equipped vehicle travels along the road;

an electronic control unit (ECU) comprising electronic circuitry and associated software, wherein the electronic circuitry comprises an image processor for processing image data captured by the first camera and the second camera;

wherein image data captured by the first camera is processed at the ECU for object detection and image data captured by the second camera is processed at the ECU for object detection;

a display screen disposed in the equipped vehicle and viewable by a driver of the equipped vehicle when driving the equipped vehicle;

wherein the ECU receives image data from the first and second cameras and provides video image signals to the display screen;

wherein, as the equipped vehicle travels along a traffic lane of the road and behind a leading vehicle ahead of the equipped vehicle and in the same traffic lane along which the equipped vehicle is traveling, the first camera views a forward blind zone ahead of the equipped vehicle, and wherein the forward blind zone includes a region that extends along an adjacent traffic lane and along a side of the leading vehicle and that is obstructed from the view of the second camera by the leading vehicle ahead of the equipped vehicle;

wherein, as the equipped vehicle travels along the traffic lane of the road and behind the leading vehicle, the display screen displays video images derived from image data captured by the first camera to provide displayed video images of the forward blind zone ahead of the equipped vehicle to the driver of the equipped vehicle;

wherein the vehicular vision system, based on detection, via processing at the ECU of image data captured by the first camera, of an object present in a field of view of the first camera that is not detected, via processing at the ECU of image data captured by the second camera, in a field of view of the second camera, determines that the detected object is present in the forward blind zone; and wherein the vehicular vision system, responsive at least in part to determination that the detected object is present in the forward blind zone, displays at the display screen video images derived from image data captured by the first camera.

2. The vehicular vision system of claim 1, wherein the display screen is disposed at an A-pillar of the equipped vehicle at the side of the equipped vehicle at which the camera is disposed.

3. The vehicular vision system of claim 1, wherein the display screen displays video images derived from image data captured by the first camera responsive to actuation by the driver of a user actuatable input in the equipped vehicle.

4. The vehicular vision system of claim 1, wherein the display screen displays video images derived from image data captured by the first camera responsive to determination that the equipped vehicle is commencing a passing maneuver to pass the leading vehicle.

5. The vehicular vision system of claim 1, wherein the first camera is disposed at an outboard portion of an exterior rearview mirror assembly at the side of the equipped vehicle.

6. The vehicular vision system of claim 1, wherein the first camera views along the adjacent traffic lane at least thirty meters forward of the equipped vehicle.

7. The vehicular vision system of claim 1, wherein the first camera comprises a driver side forward viewing camera disposed at a driver-side exterior rearview mirror assembly at a driver side of the equipped vehicle so as to view at least forward and sideward of the equipped vehicle at the driver side of the equipped vehicle and to view a driver-side forward blind zone ahead of the equipped vehicle, and wherein the driver-side forward blind zone extends along an adjacent driver-side traffic lane and along a driver side of the leading vehicle, and wherein the vehicular vision system further comprises a passenger side forward viewing camera disposed at a passenger-side exterior rearview mirror assembly at a passenger side of the equipped vehicle so as to view at least forward and sideward of the equipped vehicle at the passenger side and to view a passenger-side forward blind zone ahead of the equipped vehicle, and wherein the passenger-side forward blind zone includes a region that extends along an adjacent passenger-side traffic lane and along a passenger side of the leading vehicle and that is obstructed from the view of the second camera by the leading vehicle ahead of the equipped vehicle, and wherein the display screen, responsive to processing by the image processor of image data captured by the driver side forward viewing camera and the passenger side forward viewing camera, displays video images derived from image data captured by one or both of the driver side forward viewing camera and the passenger side forward viewing camera.

8. The vehicular vision system of claim 7, wherein the display screen is operable to display surround view video images derived from image data captured by a plurality of exterior viewing cameras at the equipped vehicle, the plurality of exterior viewing cameras comprising a rear backup camera of the equipped vehicle disposed at a rear portion of the equipped vehicle and having a field of view at least rearward of the equipped vehicle, a driver-side sideward viewing camera of the equipped vehicle disposed at the driver side of the equipped vehicle and having a field of view at least sideward of the equipped vehicle at the driver side and a passenger-side sideward viewing camera of the equipped vehicle disposed at the passenger side of the equipped vehicle and having a field of view at least sideward of the equipped vehicle at the passenger side.

9. The vehicular vision system of claim 8, wherein the driver side forward viewing camera and the passenger side forward viewing camera are not part of the plurality of exterior viewing cameras that capture image data for the displayed surround view video images.

10. The vehicular vision system of claim 9, wherein, responsive to actuation of a user actuatable input in the equipped vehicle, the display screen displays video images derived only from image data captured by the driver side forward viewing camera and the passenger side forward viewing camera.

11. The vehicular vision system of claim 1, wherein the first camera views an A-pillar blind zone of the equipped vehicle.

12. The vehicular vision system of claim 11, wherein the display screen, responsive to processing at the ECU of image data captured by the first camera, displays video images derived from image data captured by the first camera to provide displayed images representative of the A-pillar blind zone.

13. The vehicular vision system of claim 12, wherein the display screen, responsive to an input, displays video images derived from image data captured by the first camera to provide displayed images representative of the forward blind zone.

14. The vehicular vision system of claim 13, wherein the input comprises a user actuatable input disposed at an interior portion of the equipped vehicle and actuatable by the driver of the equipped vehicle.

15. The vehicular vision system of claim 13, wherein the input comprises determination that the detected object is present in the forward blind zone.

16. A vehicular vision system, the vehicular vision system comprising:
a driver-side forward viewing camera disposed at an outboard portion of a driver-side exterior rearview mirror at a driver side of a vehicle equipped with the vehicular vision system, wherein the driver-side forward viewing camera views at least forward and sideward of the equipped vehicle, and wherein the driver-side forward viewing camera captures image data as the equipped vehicle travels along a road;
a passenger-side forward viewing camera disposed at an outboard portion of a passenger-side exterior rearview mirror at a passenger side of a vehicle equipped with the vehicular vision system, wherein the passenger-side forward viewing camera views at least forward and sideward of the equipped vehicle, and wherein the passenger-side forward viewing camera captures image data as the equipped vehicle travels along the road;
a central forward viewing camera disposed between the driver-side forward viewing camera and the passenger-side forward viewing camera of the equipped vehicle, wherein the central forward viewing camera views at least forward of the equipped vehicle, and wherein the central forward viewing camera captures image data as the equipped vehicle travels along the road;
an electronic control unit (ECU) comprising electronic circuitry and associated software, wherein the electronic circuitry comprises an image processor for processing image data captured by the driver-side forward viewing camera, the passenger-side forward viewing camera, and the central forward viewing camera;

wherein image data captured by the driver-side forward viewing camera is processed at the ECU for object detection and image data captured by the passenger-side forward viewing camera is processed at the ECU for object detection and image data captured by the central forward viewing camera is processed at the ECU for object detection;

a display screen disposed in the equipped vehicle and viewable by a driver of the equipped vehicle when driving the equipped vehicle;

wherein the ECU receives image data from the driver-side forward viewing camera, the passenger-side forward viewing camera and the central forward viewing camera and provides video image signals to the display screen;

wherein, as the equipped vehicle travels along a traffic lane of the road and behind a leading vehicle ahead of the equipped vehicle and in the same traffic lane along which the equipped vehicle is traveling, the driver-side forward viewing camera views a driver-side forward blind zone ahead of the equipped vehicle, and wherein the driver-side forward blind zone includes a driver-side region that extends along an adjacent driver-side traffic lane and along a driver side of the leading vehicle and that is obstructed from the view of the central forward viewing camera by the leading vehicle ahead of the equipped vehicle;

wherein, as the equipped vehicle travels along the traffic lane of the road and behind the leading vehicle, the passenger-side forward viewing camera views a passenger-side forward blind zone ahead of the equipped vehicle, and wherein the passenger-side forward blind zone includes a passenger-side region that extends along an adjacent passenger-side traffic lane and along a passenger side of the leading vehicle and that is obstructed from the view of the central forward viewing camera by the leading vehicle ahead of the equipped vehicle;

wherein, as the equipped vehicle travels along the traffic lane of the road and behind the leading vehicle, the display screen displays video images derived from image data captured by the driver-side forward viewing camera or the passenger-side forward viewing camera to provide displayed video images of the driver-side forward blind zone or the passenger-side forward blind zone ahead of the equipped vehicle to the driver of the equipped vehicle;

wherein the display screen displays video images derived from image data captured by the driver-side forward viewing camera or the passenger-side forward viewing camera responsive to actuation by the driver of a user actuatable input in the equipped vehicle;

wherein the vehicular vision system, based on detection, via processing at the ECU of image data captured by the driver-side forward viewing camera, of an object present in a field of view of the driver-side forward viewing camera that is not detected, via processing at the ECU of image data captured by the central forward viewing camera, in a field of view of the central forward viewing camera, determines that the detected object is present in the driver-side forward blind zone;

wherein the vehicular vision system, responsive at least in part to determination that the detected object is present in the driver-side forward blind zone, displays at the display screen video images derived from image data captured by the driver-side forward viewing camera;

wherein the vehicular vision system, based on detection, via processing at the ECU of image data captured by the passenger-side forward viewing camera, of an object present in a field of view of the passenger-side forward viewing camera that is not detected, via processing at the ECU of image data captured by the central forward viewing camera, in the field of view of the central forward viewing camera, determines that the detected object is present in the passenger-side forward blind zone; and wherein the vehicular vision system, responsive at least in part to determination that the detected object is present in the passenger-side forward blind zone, displays at the display screen video images derived from image data captured by the passenger-side forward viewing camera.

17. The vehicular vision system of claim 16, wherein the display screen comprises two display screens, and wherein a driver-side display screen is disposed at an A-pillar of the equipped vehicle at the driver side of the equipped vehicle and displays video images derived from image data captured by the driver-side forward viewing camera, and wherein a passenger-side display screen is disposed at an A-pillar of the equipped vehicle at the passenger side of the equipped vehicle and displays video images derived from image data captured by the passenger-side forward viewing camera.

18. The vehicular vision system of claim 16, wherein the driver-side forward viewing camera views along the adjacent driver-side traffic lane at least thirty meters forward of the equipped vehicle, and wherein the passenger-side forward viewing camera views along the adjacent passenger-side traffic lane at least thirty meters forward of the equipped vehicle.

19. A vehicular vision system, the vehicular vision system comprising:

a driver-side forward viewing camera disposed outboard of a driver side of a vehicle equipped with the vehicular vision system, wherein the driver-side forward viewing camera views at least forward and sideward of the equipped vehicle, and wherein the driver-side forward viewing camera captures image data as the equipped vehicle travels along a road;

a passenger-side forward viewing camera disposed outboard of a passenger side of a vehicle equipped with the vehicular vision system, wherein the passenger-side forward viewing camera views at least forward and sideward of the equipped vehicle, and wherein the passenger-side forward viewing camera captures image data as the equipped vehicle travels along the road;

a central forward viewing camera disposed between the driver-side forward viewing camera and the passenger-side forward viewing camera of the equipped vehicle, wherein the central forward viewing camera views at least forward of the equipped vehicle, and wherein the central forward viewing camera captures image data as the equipped vehicle travels along the road;

an electronic control unit (ECU) comprising electronic circuitry and associated software, wherein the electronic circuitry comprises an image processor for processing image data captured by the driver-side forward viewing camera, the passenger-side forward viewing camera, and the central forward viewing camera;

wherein image data captured by the driver-side forward viewing camera is processed at the ECU for object detection and image data captured by the passenger-side forward viewing camera is processed at the ECU for object detection and image data captured by the central forward viewing camera is processed at the ECU for object detection;

a display screen disposed in the equipped vehicle and viewable by a driver of the equipped vehicle when driving the equipped vehicle;

wherein the ECU receives image data from the driver-side forward viewing camera, the passenger-side forward viewing camera and the central forward viewing camera and provides video image signals to the display screen;

wherein, as the equipped vehicle travels along a traffic lane of the road and behind a leading vehicle ahead of the equipped vehicle and in the same traffic lane along which the equipped vehicle is traveling, the driver-side forward viewing camera views a driver-side forward blind zone ahead of the equipped vehicle, and wherein the driver-side forward blind zone includes a driver-side region that extends along an adjacent driver-side traffic lane and along a driver side of the leading vehicle and that is obstructed from the view of the central forward viewing camera by the leading vehicle ahead of the equipped vehicle;

wherein, as the equipped vehicle travels along the traffic lane of the road and behind the leading vehicle, the passenger-side forward viewing camera views a passenger-side forward blind zone ahead of the equipped vehicle, and wherein the passenger-side forward blind zone includes a passenger-side region that extends along an adjacent passenger-side traffic lane and along a passenger side of the leading vehicle and that is obstructed from the view of the central forward viewing camera by the leading vehicle ahead of the equipped vehicle;

wherein, as the equipped vehicle travels along the traffic lane of the road and behind the leading vehicle, the display screen displays video images derived from image data captured by the driver-side forward viewing camera or the passenger-side forward viewing camera to provide displayed video images of the driver-side forward blind zone or the passenger-side forward blind zone ahead of the equipped vehicle to the driver of the equipped vehicle;

wherein the display screen displays video images derived from image data captured by one of the driver-side forward viewing camera or the passenger-side forward viewing camera responsive to determination that the equipped vehicle is commencing a passing maneuver to pass the leading vehicle in the respective one of the adjacent driver-side traffic lane or the adjacent passenger-side traffic lane;

wherein the vehicular vision system, based on detection, via processing at the ECU of image data captured by the driver-side forward viewing camera, of an object present in a field of view of the driver-side forward viewing camera that is not detected, via processing at the ECU of image data captured by the central forward viewing camera, in a field of view of the central forward viewing camera, determines that the detected object is present in the driver-side forward blind zone;

wherein the vehicular vision system, responsive at least in part to determination that the detected object is present in the driver-side forward blind zone, displays at the display screen video images derived from image data captured by the driver-side forward viewing camera;

wherein the vehicular vision system, based on detection, via processing at the ECU of image data captured by the passenger-side forward viewing camera, of an object present in a field of view of the passenger-side forward viewing camera that is not detected, via processing at the ECU of image data captured by the central forward viewing camera, in the field of view of the central forward viewing camera, determines that the detected object is present in the passenger-side forward blind zone; and wherein the vehicular vision system, responsive at least in part to determination that the detected object is present in the passenger-side forward blind zone, displays at the display screen video images derived from image data captured by the passenger-side forward viewing camera.

20. The vehicular vision system of claim 19, wherein the display screen comprises two display screens, and wherein a driver-side display screen is disposed at an A-pillar of the equipped vehicle at the driver side of the equipped vehicle and displays video images derived from image data captured by the driver-side forward viewing camera, and wherein a passenger-side display screen is disposed at an A-pillar of the equipped vehicle at the passenger side of the equipped vehicle and displays video images derived from image data captured by the passenger-side forward viewing camera.

21. The vehicular vision system of claim 19, wherein the driver-side forward viewing camera views along the adjacent driver-side traffic lane at least thirty meters forward of the equipped vehicle, and wherein the passenger-side forward viewing camera views along the adjacent passenger-side traffic lane at least thirty meters forward of the equipped vehicle.

* * * * *